June 12, 1923.
C. E. FAIRBURN
1,458,692
CONDUCTOR ARRANGEMENT OF ELECTRIC TRACTION SYSTEM
Filed Sept. 22, 1920
3 Sheets-Sheet 2
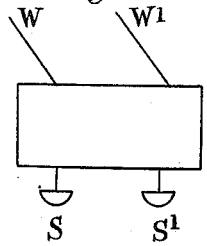
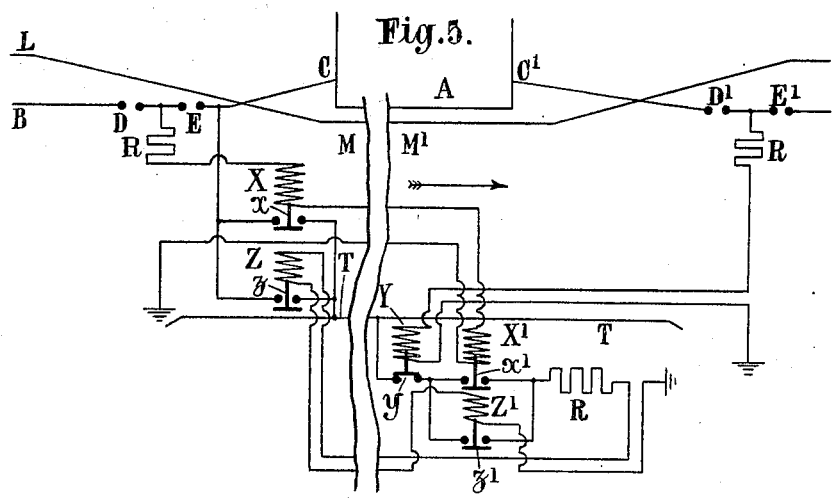
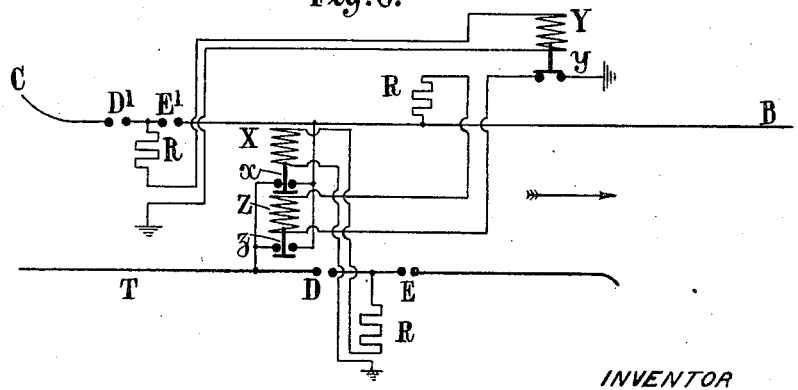
INVENTOR
Charles Edward Fairburn
By Byrnes, Stebbins, Burgess & Parmelee
his attys.

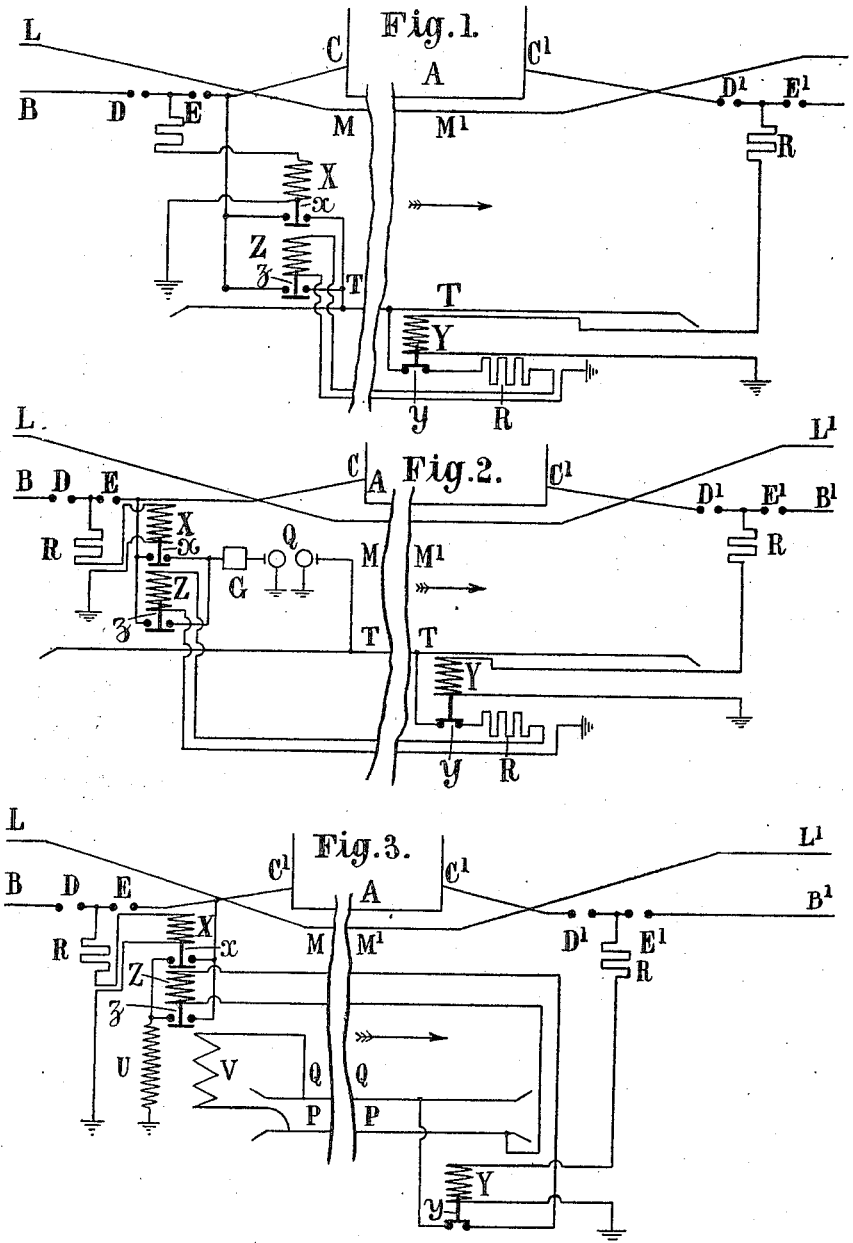

June 12, 1923.
C. E. FAIRBURN
1,458,692
CONDUCTOR ARRANGEMENT OF ELECTRIC TRACTION SYSTEM
Filed Sept. 22, 1920     3 Sheets-Sheet 3
Fig. 7ª
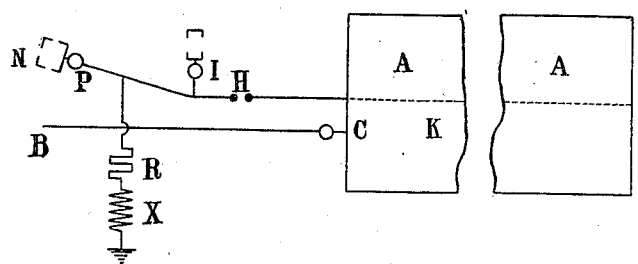
Fig. 7ᵇ
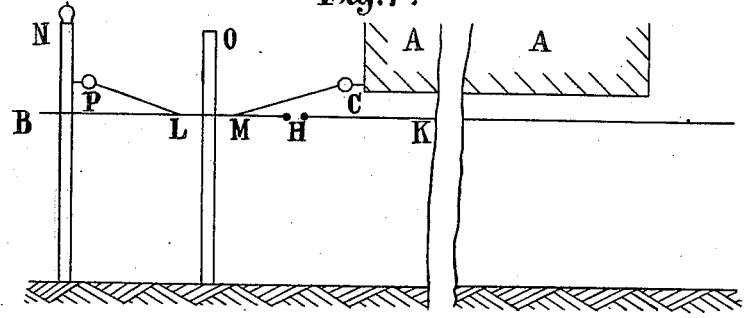
Fig. 8.
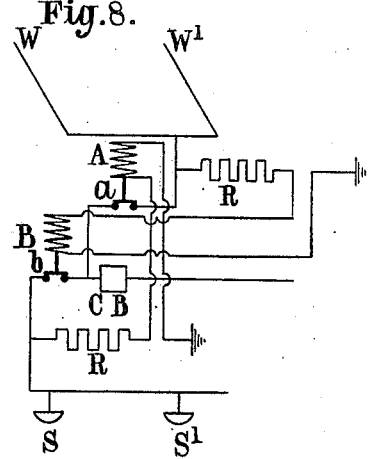
INVENTOR
Charles Edward Fairburn,
by Byrnes, Stebbins, Burgess-Parmalee
his attys.

Patented June 12, 1923.

1,458,692

UNITED STATES PATENT OFFICE.

CHARLES EDWARD FAIRBURN, OF LONDON, ENGLAND.

CONDUCTOR ARRANGEMENT OF ELECTRIC TRACTION SYSTEM.

Application filed September 22, 1920. Serial No. 412,097.

*To all whom it may concern:*

Be it known that I, CHARLES EDWARD FAIRBURN, a subject of the King of England, residing at London, England, have invented certain new and useful Improvements in Conductor Arrangements of Electric Traction Systems, of which the following is a specification.

This invention relates to electric traction systems of the kind in which the supply conductors are divided into sections, one or more of which is or are cut into and out of circuit as required.

The invention deals particularly with the case where the method of supplying current is varied at different points in the line to suit local conditions; for instance on a line where the normal supply is by means of an overhead conductor it is desirable sometimes to change to a third rail supply, at certain points, for instance when passing through a tunnel where there is not sufficient height for the overhead conductor to be used satisfactorily. Another example is provided by the case where the normal supply is by way of a third rail while an overhead conductor is used in sidings or goods yards. In these cases and under other somewhat similar conditions it is desirable that the conductor which is adapted to meet the peculiar local conditions (it is hereafter spoken of as the "supplementary conductor") should be arranged to be in connection with the source of energy only during the period when it is required to be used for traffic.

It has been proposed to obtain this result by employing as a supplementary conductor a movable bar which normally is held out of the position in which it can be engaged by the collector and is adapted to be moved into the operative position at the approach of a train and to be returned into the inoperative position when the train has left the section. In such an arrangement the movable conductor bar constitutes part of a switch which is closed only when the bar is in the operative position and which controls the supply of current to the bar. The present invention provides an arrangement whereby the same result as regards making the supplementary conductor alive only when it is required to be used is attained under the more normal conditions in which the supplementary conductor is fixed in position.

In carrying out the invention, an arrangement on somewhat similar lines to those used in connection with sectional conductor or stud-contact systems of traction is employed. It is however constructed so as to avoid the necessity for bridging between the main and the supplementary conductors by the collecting gear of the vehicle. This provision is of importance for the object in view since, in general, different forms of collectors, each with its separate appropriate form of connection to the vehicle circuits, will be in use and preferably no one of the collectors should be alive when it is out of contact with its conductor as it is liable to be if there is a bridging connection between the two collectors or sets of collectors. Moreover, in some cases the voltage or other characteristic of the supply to the two conductors will be different. The arrangement also comprises mechanism for dealing with the automatic cutting out of the supplementary conductor as the vehicle or train (hereafter referred to as vehicle) is leaving the section.

The means for cutting in the supplementary conductor comprises an electromagnetically operated switch the coil of which is in connection with an insulated section of the main conductor system which is put into connection with the adjacent part of the system when a vehicle is entering the section fed from the supplementary conductor. In addition to this first switch a second switch or coil is provided to maintain the circuit after the vehicle has passed the insulated section of the main conductor. The holding-in coil for the first switch or the coil which operates and holds in a second switch in parallel with the first is connected in a shunt circuit from the supplementary conductor so that it remains effective as long as the supplementary conductor is alive and the shunt circuit is undisturbed. In order to cut out the supplementary conductor another electro-magnetic switch is provided to produce the opening or alteration of this shunt circuit which is necessary in order to make the holding-in coil ineffective. This switch controlling the shunt circuit may either be arranged so as to normally maintain this circuit closed when it is in series with the holding-in coil, or it may be arranged to keep the circuit normally open and then it is placed in parallel with the holding-in coil, and the change which is effected in the position of this switch when the vehicle is about to leave the supplementary conductor may be brought about either by energizing or de-energizing the coil which controls the position of the switch. The arrangement which appears preferable is that in which the switch is located in series with the holding-in coil in the shunt circuit and remains closed until its coil is energized, which takes place when it is required that the supplementary conductor should be cut out.

Examples of methods of carrying the invention into effect will be described in connection with the accompanying diagrams of which Figures 1, 2 and 3 show conductor and switching arrangements for dealing with the case of a tunnel or station;

Figure 4 indicates the type of collecting arrangement used on the vehicle;

Figures 5 and 6 show switching arrangements for dealing with particular conditions;

Figures 7a and 7b, show in plan and elevation respectively overhead conductor arrangements suitable for use in connection with this invention; and Figure 8 shows an arrangemet of automatic switches on a vehicle for dealing with the change over from the main to the supplementary conductor and vice versa.

In the drawings, for the sake of clearness, the switches and the coils which operate them, are shown separated. In order, however, to show the dependent relationship of these parts the same letter is used for the switch and the corresponding coil, the latter being indicated by the capital letter and the former by the small letter.

In Figures 1, 2 and 3, the case of a system in which the normal supply is by overhead conductor is dealt with. A supplementary third rail conductor is employed to deal with local conditions due to the passage of the line through a tunnel or station. In these three diagrams, A indicates the arch of the tunnel or the roof of the station. The overhead line is indicated by B, C and C' E' being anchored off at C and C'. This line contains or has adjacent to it insulated sections D, E and D' E' with which are connected, through resistances R, coils X and Y so arranged that when the sections D, E, and D' E' are made alive a current flows through the coils X and Y to earth. A guard wire L, M, or L' M' is arranged to prevent the overhead collectors on the vehicle from striking the top of the tunnel or the roof. The third rail supplementary conductor T is connected to the overhead line B, C through a conductor which has, in two parallel portions, switches x and z. Switch x is controlled by the coil X and the switch z is controlled by the coil Z connected in a shunt circuit from rail T to earth a resistance R being provided in this circuit. This shunt circuit also contains a switch y which normally remains closed and is only opened when the coil Y is energized.

In Figures 1, 2, 3 and 6 the direction of travel of the vehicle is indicated by an arrow. The switches are shown in all cases in the positions which they occupy when their coils are without current. The operation of the switching arrangement is as follows:—

As a vehicle enters the part of the line fed by the third rail T it reaches a position in which one overhead collector W is on the live part of the line B, D while the other overhead collector W' is on the insulated section D, E. Under these conditions the coil X carries current and closes the switch x making the connection between the overhead line and the third rail. This causes current to flow through the shunt circuit energizing the coil Z which closes the switch z so that the circuit in the third rail T is maintained by this holding in coil Z after the insulated part D, E of the overhead line has become dead again. When the vehicle is about to leave the third rail T the insulated section of the overhead line D' E' is made alive temporarily by the action of the overhead collectors and the coil Y carries current and opens the switch y, which breaks the circuit of the coil Z and thereby allows the switch z to open, which cuts off the supply from the third rail T.

In some cases it is desirable to modify the characteristics of the supply where the change in the method of feeding the vehicle takes place. For example it may be desirable to work the third rail at a lower voltage than the overhead line. Figures 2 and 3 show methods of dealing with this requirement, the former showing the case of direct current supply and the latter the case for alternating current.

In the connections shown in Figure 2 a motor generator Q or equivalent device is located in the connection between the overhead line and the third rail and has an automatic starter G in circuit with it. With this arrangement when the switch x is closed the motor generator starts up and supplies the third rail at a suitably reduced voltage.

In Figure 3 the primary U of a transformer is connected with the overhead line through switches x and z and the secondary is connected with a pair of rails P and Q across which the shunt circuit containing the coil Z and switch y is arranged.

The supplementary conductors should in all cases be arranged so as to overlap, at both ends, the main conductors; the insulated section D, E being placed so that the supplementary conductor becomes alive before the overhead collectors leave the line B, C and pass on to the guard wire L, M. In the arrangement shown in Figure 2 the section D, E should be located sufficiently far from the entrance to the tunnel or station to permit the motor generator set to run up to full speed before the overhead collectors pass on to the guard wire.

It will generally be convenient to place indicators at the side of the track to show the driver when the change over to and from the supplementary conductor takes place. It will also generally be advantageous to provide signal lamps or other indicators to show when the supplementary conductors are alive. For instance in a tunnel red lamps can be arranged at intervals along the line so as to indicate to workmen in the tunnel when the third rail is alive; the operation of these indicators can be brought about by connecting the lamps to the third rail or to the conductor which supplies it.

It is possible that in the arrangement shown in Figure 2 the momentum of the motor generator set Q may cause the coil Z to be energized again after the coil Y has become ineffective thus making the third rail alive again. This result can be avoided by utilizing an arrengement such as shown in Figure 5 which is to be understood as substituted for the corresponding part of Figure 2. In this arrangement additional switches are provided in the shunt circuit so as to provide for the permanent opening of this shunt circuit after the third rail T has been rendered dead by the action of the coil Y until the coil X is again made effective. The supplementary switches $x'$ and $z'$ are arranged to be actuated simultaneously with the switches $x$ and $z$ by the action of the coils X and Z or other coils energized simultaneously with those coils. Accordingly the shunt circuit is closed when the section D, E of the overhead line is made alive, and is then maintained closed by the action of the coil Z or its associated coil until the switch $y$ is opened whereupon the supplementary switch $z'$ opens so that the shunt circuit remains broken after the switch $y$ is closed again.

In Figure 6 is indicated an arrangement for the case in which the main supply is by way of a third rail T while an overhead line is used for supplying the vehicle in a sliding or goods yard. For these conditions it is necessary that the supplementary conductor, in this case the overhead line, should be alive from the time when the vehicle enters the siding or yard until it leaves. This condition will be fulfilled if the insulated section D, E for the operating coil X which in this case is associated with the third rail T, as this rail is now the main conductor, is situated somewhat farther within the siding than is the insulated section D' E' for operating the coil Y. In the figure the section D' E' is shown in the overhead line and the section D, E in the third rail and it is pointed out that in general the location of the section D' E' may be in either the main or the supplementary conductor but the section D, E must be in the main conductor.

Although a method of rendering the sections D, E and D' E' alive has been described, in which the use of two collectors is necessary, it is to be understood that these sections may be arranged so that a single collector may bridge between the main conductor and the section. A convenient arrangement for the use of a single overhead collector is shown in Figures 7a and 7b. In this arrangement the guard wire P, K is maintained in the disposition shown by suitable anchoring at the pole N and supports at other points, including the pole O. The overhead line is in the same horizontal plane with the guard wire between the points L and M but they are separated by a suitable distance. The portion P, H of the guard wire forms the insulated section, (this being previously indicated by D, E or D' E') being insulated at P, H and I and at any other supports that may be necessary. The distance M, H is made considerably longer than the distance between overhead collectors when two of these are used on a vehicle. Assuming that the arrangement is at the end at which the vehicle enters the tunnel, the operation is as follows:—

As the vehicle approaches the tunnel the overhead collector bridges the line and the guard wire between L and M thus energizing the coil X; the collector then leaves the overhead line at M and travels on the guard wire towards K. If there be two overhead collectors on the vehicle the portion of the guard wire between L and H remains alive until both collectors have passed the point M.

In cases where it is not desirable to leave the operation of changing the connections between the collectors and the train circuits, which have to be made when changing to and from the supplementary conductor, in the hands of the driver an automatic arrangement may be provided such as that described in patent specification No. 15149/13 or such as that shown in Figure 8. In this latter arangement a switch $a$ is provided in the connections from the overhead collectors W and W' to the train circuits and another switch $b$ is provided in the circuit from the third rail collectors S and S' to the train circuits. The switch $a$ is controlled by a coil A connected between the collectors S and S' and earth, a suitable resistance R being inserted in the circuit of the coil. Similarly the switch $b$ is controlled by a coil B connected between the collectors W and W' and earth. A circuit breaker C B is preferably provided on the train circuits.

When the vehicle is taking current from the overhead line the coil B will be energized and thereby the switch $b$ will be opened while the switch $a$ is closed. At the part where the overhead line and the third rail overlap both the coils A and B will be energized and both switches $a$ and $b$ opened, and when this overlapping part is passed and the collectors are on the third rail only the coil B will be de-energized so that the switch $b$ closes while the switch $a$ is held open. At the other end of the supplementary conductor the operation will be performed in the reverse order.

It is to be understood that the arrangements illustrated in the accompanying drawings have only been given by way of example and that the invention is not limited to the precise details there shown. The precise construction employed must necessarily depend upon the special circumstances of each case. For instance under some conditions it may be necessary or advantageous to employ relays in connection with the automatic switches.

What I claim as my invention and desire to secure by Letters Patent is:—

1. In a conductor arrangement for an electric traction system comprising a main conductor and a supplementary conductor fixed in position and to be made alive when a vehicle is about to enter the section comprising the supplementary conductor, the combination of an electro-magnetic device having a coil normally separated from both the main and supplementary conductors but connectible with the main conductor by the agency of the vehicle and an electric connection closed thereby when the device is energized and serving to make the supplementary conductor alive, a second electro-magnetic device energized from the supplementary conductor when it is alive and serving to keep this conductor alive, and means for de-energizing the said second electro-magnetic device, said de-energizing means comprising a third electro-magnetic device fed from the conductor system through the collector arrangement of the vehicle when it is near the point at which it leaves the supplementary conductor.

2. In a conductor arrangement for an electric traction system comprising a main conductor and a supplementary conductor fixed in position and to be made alive when a vehicle is about to enter the section comprising the supplementary conductor, the combination of an electro-magnetic device having a coil normally separated from both the main and supplementary conductors but connectible with the main conductor by the agency of the vehicle and an electric connection closed thereby when the device is energized and serving to make the supplementary conductor alive, a second electro-magnetic device serving to keep the supplementary conductor alive and comprising a coil in a shunt circuit from this conductor, and means for de-energizing the said second electro-magnetic device, said de-energizing means comprising a third electro-magnetic device fed from the conductor system through the collector arrangement of the vehicle when it is near the point at which it leaves the supplementary conductor, and serving to open the shunt circuit containing the coil of the second electro-magnetic device.

3. In a conductor arrangement for an electric traction system comprising a main conductor and a supplementary conductor fixed in position and to be made alive through the intermediary of a rotary machine when a vehicle is about to enter the section comprising the supplementary conductor, the combination of an electro-magnetic device having a coil normally separated from both the main and supplementary conductors but connectible with the main conductor by the agency of the vehicle and an electric connection closed thereby when the device is energized and serving to make the supplementary conductor alive, a second electro-magnetic device serving to keep the supplementary conductor alive and comprising a coil in a shunt circuit from this conductor, means for de-energizing the said second electro-magnetic device, said de-energizing means comprising a third electro-magnetic device fed from the conductor system through the collector arrangement of the vehicle when it is near the point at which it leaves the supplementary conductor, and serving to open the shunt circuit containing the coil of the second electro-magnetic device, and electro-magnetic means for maintaining this shunt circuit open after the third electro-magnetic device has ceased to act.

4. In a conductor arrangement for an electric traction system comprising a main conductor and a supplementary conductor fixed in position and to be made alive through the intermediary of a rotary machine when a vehicle is about to enter the section comprising the supplementary conductor, the combination of an electro-magnetic device having a coil normally separated from both the main and supplementary conductors but connectible with the main conductor by the agency of the vehicle and an electric connection closed thereby when the device is energized and serving to make the supplementary conductor alive, a second electro-magnetic device serving to keep the supplementary conductor alive and comprising a coil in a shunt circuit from this conductor, means for de-energizing the said second electro-magnetic device, said de-energizing means comprising a third electro-magnetic device fed from the conductor system through the collector arrangement of the vehicle when it is near the point at which it leaves the supplementary conductor, and serving to open the shunt circuit containing the coil of the second electromagnetic device, and electro-magnetic means for maintaining this shunt circuit open after the third electro-magnetic device has ceased to act, said means comprising two switches in parallel each bridging a break in the circuit of the coil of the second electro-magnetic device, electro-magnetic means for closing one of said two switches when the first electro-magnetic device is energized and for closing the other of said two switches when the second electro-magnetic device is energized.

In testimony whereof I affix my signature.

CHARLES EDWARD FAIRBURN.